United States Patent [19]

Kaiser et al.

[11] 4,027,333
[45] May 31, 1977

[54] MULTIPLEX COLOR TELEVISION TRANSMISSION SYSTEM

[75] Inventors: Arthur Kaiser, Trumbull; Henry W. Mahler, Newtown; Renville H. McMann, Jr., New Canaan, all of Conn.

[73] Assignee: CBS Inc., New York, N.Y.

[22] Filed: Dec. 9, 1975

[21] Appl. No.: 639,012

[52] U.S. Cl. .............................. 358/146; 358/12; 360/11

[51] Int. Cl.² ........................................ H04N 7/08

[58] Field of Search ............ 358/12, 4, 8, 142, 146; 178/DIG. 23, DIG. 6, 5.8 R; 360/11

[56] References Cited
UNITED STATES PATENTS

| | | | |
|---|---|---|---|
| 3,686,436 | 8/1972 | Camras | 360/11 |
| 3,886,589 | 5/1975 | Nasu | 360/11 |
| 3,924,060 | 12/1975 | Bedford | 178/DIG. 23 |

*Primary Examiner*—Howard W. Britton

*Attorney, Agent, or Firm*—Spencer E. Olson

[57] ABSTRACT

System for transmitting and receiving two complete color television pictures from two separate sources in common synchronism wherein the odd-numbered fields of the picture from one of the sources are transmitted in alternation with even-numbered fields of the other of the sources and wherein reception and reconstruction of the two pictures is accomplished by alternately storing the successive odd- and even-numbered fields in a field store having a delay of one field plus or minus half a line and recombining the delayed fields with their respective undelayed fields to recreate the two separate pictures. By utilizing a delay of exactly one field plus or minus half a line (i.e., 262 or 263 lines in the NTSC system), the delayed version of each of the two fields is fully interlaced positionally with its respective undelayed field, with the color subcarrier in exactly the proper phase in the preferred case of a 262 line delay, thereby to facilitate the use of line interpolation to improve the quality of the reproduced pictures.

22 Claims, 10 Drawing Figures

MULTIPLEX COLOR TELEVISION TRANSMISSION SYSTEM

BACKGROUND OF THE INVENTION

This invention relates to transmission and reception of video pictures and, more particularly, to the multiplexed transmission of two television pictures on the same link on a field-sharing basis and reception and reconstruction of the two pictures.

Because there is a limited number of radio frequency channels available, or because a given radio frequency channel may be available for only a limited period of time, there is a need for a system capable of transmitting more than one television picture over a single channel. For example, because of the limited number of video channels available in the satellite communication system in current use, any given user has a channel available to him for a few minutes a day and the cost per minute for use of the channel is significant. The growing appetite of the public for news, from both home and abroad, coupled with the attendant requirement to utilize satellite communication for timely foreign news coverage and its limited availability and high cost, has created a need for more effectively utilizing the limited transmission time available. If, for example, a domestic broadcaster in New York has ten minutes allotted to it on the link from London to New York, the pictorial news gathered in and about London in a given day must be edited at the sending end to present short segments of several newsworthy events and pre-taped to produce a program of precisely ten minutes duration for transmission over a single satellite channel during the allotted ten minutes. At the receiving end, the receiving material must again be edited to prepare for broadcast one or more segments of the received picture material. The pressure of editing would be somewhat relieved, and more news material could be transmitted in a given time interval, if more than one television picture could be transmitted on a common channel, or stated another way, the cost per minute of transmission of usable picture information could be reduced if more than one television picture could be multiplexed on a common channel.

Also, substantial savings could be realized in the archival storage of television programs if one were able to store, for example on video tape, only one field of each frame of a television program and to reconstruct the picture in a manner acceptable for later viewing. The current practice is to record the entire program on two-inch video tape, the cost of which is substantial and the bulk of which is such as to create a serious and expensive storage problem. By recording but one field of each frame the cost of the required video tape, and the rental cost for physically storing a given program could be cut in half.

Another area of application in which it would be desirable to transmit more than one television picture on a given channel is in the field of educational television. In many parts of the United States geographically separated institutions are tied together by microwave relay systems which enable transmission, for example, of a lecture given at one university to several other universities in the system. Such consortia of universities have regular programming sequences, but usually being limited to but one microwave channel, only one program at a time can be sent down a link. Clearly, the effectiveness of such systems would be enhanced if more than one video program could be transmitted on the same channel at the same time.

Techniques are known, from U.S. Pat. Nos. 3,725,571 and 3,745,242, for example, whereby a plurality of monochrome video pictures can be transmitted over a single television channel, on a line-sharing basis. The multiplex video transmission system described in these patents includes means for sending a plurality of $n$ separate pictures wherein every nth line of each of the pictures is selected for transmission beginning at a different line and wherein reception of the selected one of the pictures is accomplished by selecting from the plurality of lines transmitted every nth line commencing at the preselected line. The selected line is delayed by up to $n-1$ delay lines capable of delaying the signal by $n-1$ horizontal lines and then recombined with the undelayed line so that a complete picture is provided reproduction.

The line multiplexing technique described in these patents has several shortcomings which make it unacceptable for encoded color television. First, because much of the program material it is desired to transmit will be available at scanning standards other than NTSC, e.g., PAL or SECAM, it is necessary to preserve picture correlation among several successive lines in every field. To overcome this shortcoming would require use of two standards converters to permit multiplexing to be accomplished following conversion; since standards converters cost approximately half a million dollars, this solution would be prohibitively, and needlessly, expensive.

Secondly, line multiplexing produces a coarser structure than does field multiplexing on diagonal lines in a picture since the "pitch" of field lines is twice as great as that of the frame lines, even when some form of line interpolation is used. In this connection, U.S. Pat. No. 3,745,242 describes a technique of line interpolation wherein the line earlier is added to the present line in equal parts. The interpolation is done at the transmitter, which not only ruins the horizontal resolution of the entire transmission, but is applied to the delayed lines of both (assuming $n = 2$) of the programs being transmitted.

In the system of U.S. Pat. No. 3,745,242, the problem of picture "crawling" on diagonals (similar, but not the same as "NTSC crawl") is claimed to be eliminated by synchronizing the transmitter and receiver to reset after each frame so that the first picture is always transmitted on the odd lines of each frame and the second picture on the even. The requirement in a color television system for preserving continuity of color subcarrier would be seriously frustrated by resetting the line multiplex sequence every frame. This would demand a reversal of chrominance phase every frame and a further reversal of the process of the chrominance inversion that is an essential part of the line-repeating technique, which, in turn, would require some form of chrominance indexing of the television frames.

Television transmission systems are also known, from U.S. Pat. No. 3,586,767, which transmit two classes of information interleaved over the same channel. This prior system includes a television transmitter, a television relay unit and at least one receiver. The television transmitter includes means for generating fields of a first class of information and also means for producing fields of a second class of information. In general, the system is operative to substitute for one of the fields of a frame of a conventional commercial television program (general viewer information) a field of information intended for specific viewers (specific viewer information). The specific viewers could be, for example, students in a nationwide educational program, or researchers subscribing to a centralized information retrieval network. The fields are sequentially transmitted with at least one field of the second class of information inserted between two fields of the first class of information. There is also transmitted an indicator signal related to the time of occurrence of the field of the specific viewer information. The relay unit includes means for receiving the sequentially transmitted fields of information as well as control means which receive and are operative in response to the indicator signals for generating control signals. A retransmitting means in the relay unit controllably retransmits some of the received fields of information by utilizing a reconstructing means responsive to the control signals. The reconstructing means substitutes for the field of the specific viewer information one of the adjacent fields of the general viewer information so that the retransmitting means only retransmits fields of the general viewer information to the receiver.

In recovering the general viewer information the system substitutes in the field interval occupied by a field of specific viewer information the next preceding general viewer information field interlaced with itself by utilizing a delay unit designed to introduce a delay of at least one field. The patent suggests that the delay unit may be a magnetic disc provided with a recording head, a reading head located a field time downstream of the recording head, and an erase head located downstream of the reading head, with the disc rotated at a speed such that the writing head and recording head are circumferentially displaced along the track of the disc so that information entering the writing head leaves the reading head one field time later. The operativeness in color television of the described technique for interlacing the preceding field with itself in the "missing" field interval is questionable because with a one field delay, the interlaced lines would not be in geometric alignment; for proper alignment in the 525-line NTSC system the delay must be an integral number of lines, usually 263 lines in known slow motion and stop action applications, and in this event, it is further necessary to invert the chrominance signal of the delayed field in order that the chrominance not be cancelled out in the interlaced picture.

Essential to the recovery of the special viewer information is the provision of an indicator signal preceding the field in which the special viewer information is substituted for conditioning the special information decoding device. The nature of the indicator signal is not described except that it may be included in the vertical blanking signal of the field, or, may be a characteristic tone in the audio portion of the signal now being transmitted. The patent suggests that the density of fields of the specific viewer information interplexed or inserted between frames of the general viewer information can range from, say, one out of one hundred or more to the case wherein the fields alternate with general and specific classes of information, or that the alternating fields could comprise two different television programs. However, the patent does not disclose how these extensions of the described system could be accomplished, particularly since the system requires an indicator signal preceding the field in which substitution is made. Obviously, if an indicator signal were inserted in each and every field, it would lose its significance as an indicator.

Another system for transmitting two classes of video information on a common channel is described in U.S. Pat. No. 3,637,926 and includes a television transmitter including a source of fields of general viewer information and a source of fields of special viewer information. Included in the transmitter are means for superimposing a portion (e.g., 7 to 10 percent of full white level) of the field of special viewer information of a field of general viewer information to create a superimposed field, the patent stating that superposition of this protion of one field on another can be accommodated in most television programs without affecting the quality of the general viewer information. The fields of general viewer information are transmitted with the superimposed field or fields interposed therebetween, and at the receiver means are provided for separating out from the superimposed field or fields the field of special viewer information and for displaying the same. The separating means is conditioned by a first characteristic signal or indicator present at the start of the field containing a field of general viewer information on which is superimposed a field of special viewer information, and at the end of this received field a second characteristic signal which precedes the field containing the other field of the frame of general viewer information on which is superimposed the inverse of the field of special viewer information, causes transmission of the special viewer information signal to a suitable display. Thus, as in the system described immediately above, indicator signals must be included in the transmission from the transmitter to enable separation of the superimposed special viewer information from the general viewer information. The receiver includes a field store, such as the video disc delay unit described above, capable of storing one field for performing a video substraction to obtain an interlaced display of the special viewer information.

It is evident from the foregoing brief description of the relevant art of which applicants are aware that known systems do not contemplate and/or are incapable of transmitting two commercial color television programs over a single communications link, particularly when the program material to be transmitted is to be subsequently subjected to standards conversion from one color television standard to another. Accordingly, it is a primary object of the present invention to provide a relatively simple and inexpensive system for transmitting two color television programs over a common channel and reconstructing the two color programs at the receiver with a picture quality acceptable for broadcast and general viewing.

SUMMARY OF THE INVENTION

Briefly, the system according to the invention includes a transmitter for transmitting television pictures from two separate sources which are in common synchronism wherein the odd-numbered fields of the picture from one of the sources are transmitted in alternation with the even-numbered fields of the picture from the other of the sources. At the receiver, the odd- and even-numbered fields are alternately stored in a field store having a delay time differing from one field by either plus or minus half a line, and the stored fields are interlaced with their respective undelayed fields to reproduce both of the programs for display and/or recording on a suitable medium, such as video tape.

Features of the system contributing significantly to the quality of the reproduced pictures are the use of a field store of exactly a field plus or minus a half line (e.g., either exactly 262 or 263 lines in the NTSC system) to achieve proper geometric positioning of the two interlaced fields in the reproduced picture.

BRIEF DESCRIPTION OF THE DRAWINGS

Other objects, features and advantages of the invention will be apparent, and a better understanding of its construction and operation will be had, from the following detailed description when read in conjunction with the accompanying drawings, in which.

DESCRIPTION OF THE PREFERRED EMBODIMENTS

Figure 1:
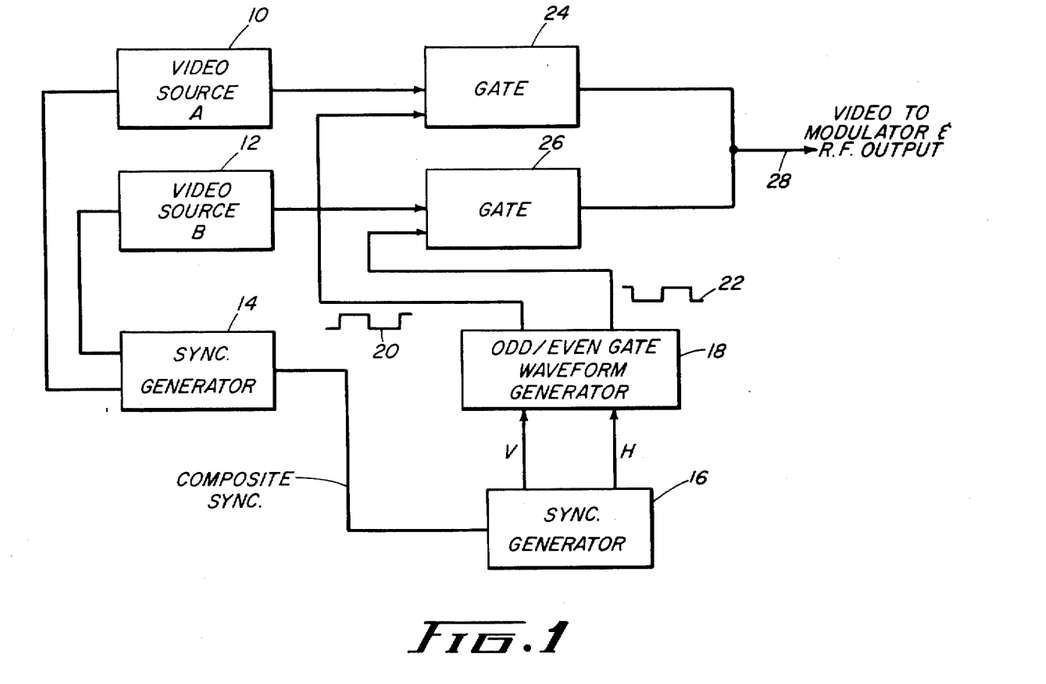
FIG. 1 is a block diagram of a transmitting system employable in the present invention.

FIG. 1 shows a system for transmitting two complete color television pictures on a common link in 2:1 multiplex which includes two separate sources 10 and 12 of television pictures, one of which is designated video source A and the other of which is video source B. Each of the sources may be a color television camera for respectively scanning a separate scene, or one source may be a live camera and the other a video tape recorder, or both sources may be pre-recorded television picture information. The two sources, whatever their form, are maintained in synchronism by a sync generator 14 in a manner well known to ones skilled in the art. The composite sync signal from sync generator 14 is separated in a sync separator 16 to obtain vertical sync pulses for controlling switching between video source A and video source B. To this end, the separated vertical and horizontal sync pulses are applied to and control an odd/even gate waveform generator 18 which generates a pair of gating waveforms 20 and 22 which are applied to the control electrode of gates 24 and 26, respectively. The video signal from source A is applied as the other input to gate 24 and video source B is connected to the other input to gate 26. Waveforms 20 and 22 are the inverse of each other and each of the pulses has a duration of one television field with the consequence that the odd-numbered fields from one of the sources, say, source A, are transmitted in alternation with the even-numbered fields of source B, with switching occurring during the vertical interval. The output signals from gates 24 and 26 are applied to a common output line 28 for application to the modulator of a conventional radio frequency transmitter, or, if desired, the multiplexed signal may be recorded on magnetic tape for subsequent transmission and/or decoding and playback. It will be understood that the system of FIG. 1 causes the picture from source A to be sent half of the time, with the picture from source B transmitted the other half of the time. The synchronization is continuous, without interruption, and as far as the picture is concerned, it appears quite acceptable in terms of scanning standards; however, if the multiplexed system were observed on a waveform or picture monitor, one would see both pictures simultaneously.

Recognizing that the video from sources A and B at any given time could have different average picture levels, or the signals supplied from a pair of distribution amplifiers that might not be carrying the DC component of the signal, in order to avoid the possibility of two different black or blanking levels in the output, the switching system includes means for clamping the signals from both sources to the same reference. Any of the clamping techniques known to the art can be employed to achieve clamping. With both signals clamped to the same reference, variations in the average picture level from the two sources will not unbalance the multiplexed signal output and the sync tips will be maintained at the same level for both fields. If clamping is not utilized, there would be an extreme excursion of the multiplexed signal that might exceed the capability of the modulator to accept and cause deterioration in the signal-to-noise ratio.

It will be evident that some sacrifice is made by the described multiplexing technique; namely, half of each picture has been discarded. From a strictly mathematical point of view, it might be said that half of the vertical resolution in the resulting picture will be lost as a consequence because, in theory, every scanning line in the full frame of two fields should contribute something to vertical resolution. In point of fact, however, as work performed many years ago by Kell and others has shown, the true vertical resolution is accepted to be about 7/10 of the number of television lines of the picture; that is, in a scene containing approximately 484 active lines (assuming that 21 lines of the vertical interval are not active) the 484 lines produce a vertical resolution of 7/10 of 484 television lines of picture height. This is true because in attempting to achieve a uniform flat field in the picture, it has been necessary to design television camera pickups with a scanning beam having a somewhat gaussian distribution radially, this distribution causing an overlap from one scanning line to the next in terms of adjacent lines in the frame. In other words, the overlap does not occur between field lines, but rather, between frame lines (ones geometrically adjacent after an elapsed time of 1/60th second). Because of the overlap between two adjacent frame lines, for example, line 1 and line 263 in the NTSC system, which is the one immediately above it in the next field, one really cannot separate information in these two lines; that is, one cannot have a distinct separation of black in line 263 and white in line 1; rather, there will be gray in both lines. Since in the normal case one does not have the 484 lines of resolution but only 7/10 of it, the sacrifice made by transmitting only one field of each frame and interlacing it with itself (in the manner to be described hereinbelow) does not cause a 2:1 degradation of vertical resolution. In fact, the resolution is believed to drop from 7/10 of 484 to about 5/10 of 484 by using the same field repeated, an amount which does not seriously affect the viewability of the resulting picture. More serious than the loss of vertical resolution is what happens to a diagonal line in the reproduced picture, which in the full frame presentation, has a certain amount of continuity. An important feature of the present invention is the provision in the receiving system, or decoder, of means for ameliorating this problem.

Figure 2:
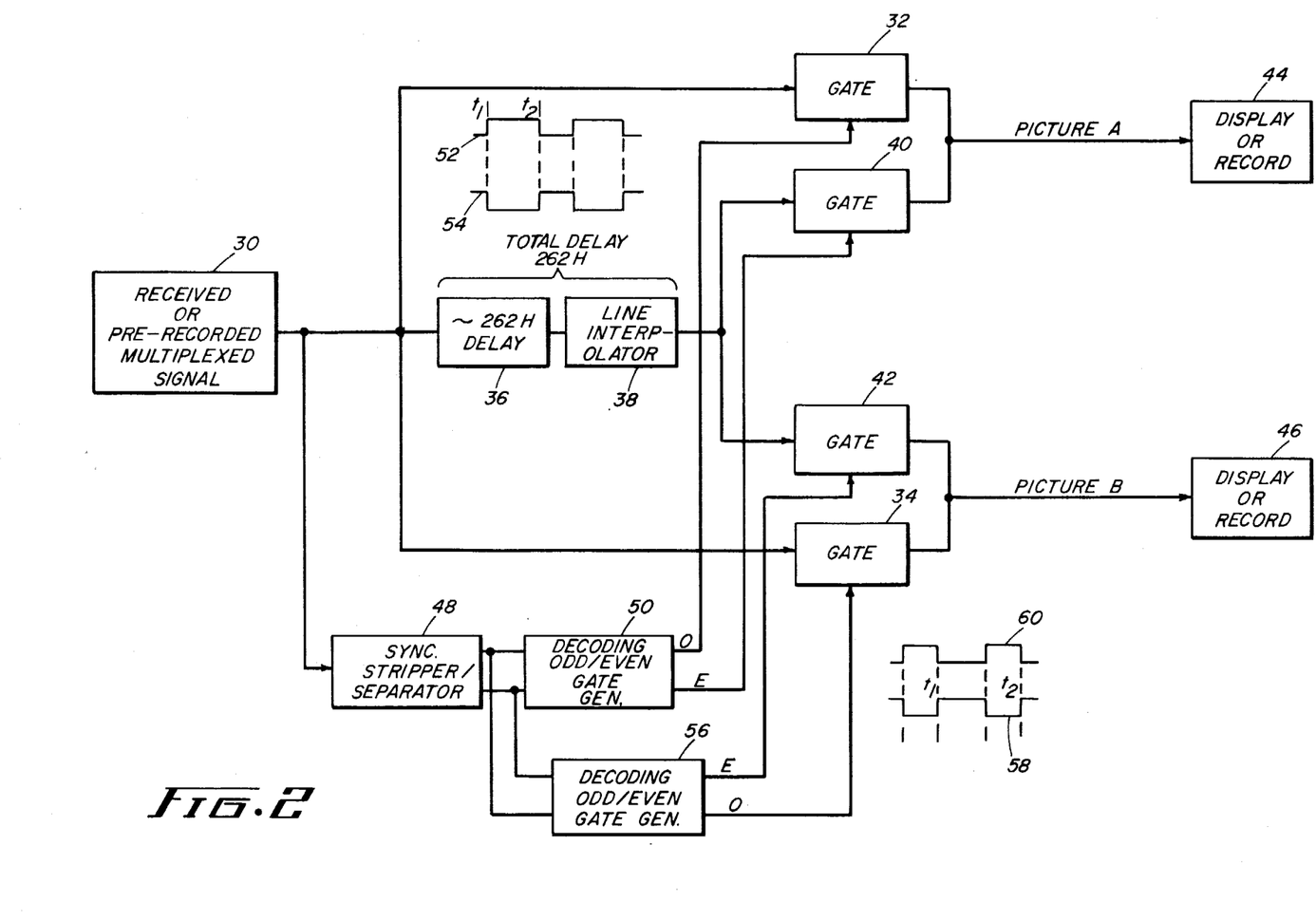
FIG. 2 is a block diagram of a preferred embodiment of a receiving system in accordance with the invention.
Figure 2A:
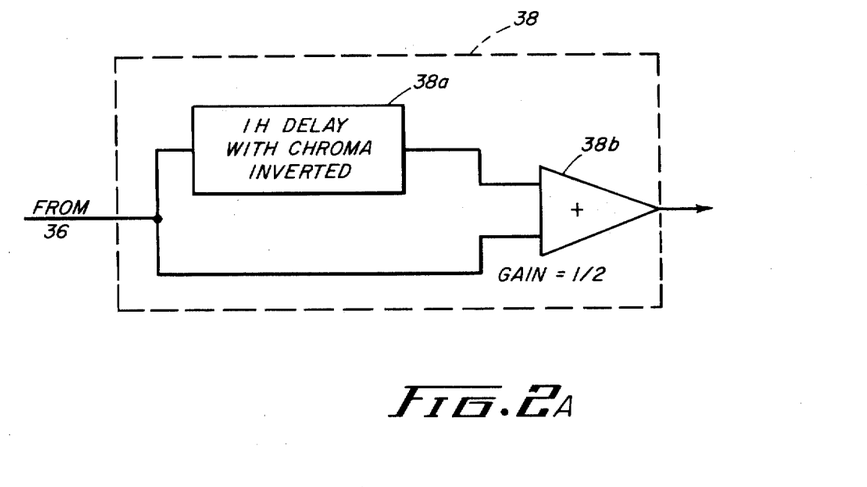
FIG. 2A is a block diagram of a line interpolator useful in the system of FIG. 2.

FIG. 2 shows in block diagram form a preferred embodiment of a system for recreating from the multiplexed signal delivered by the system of FIG. 1 two separate pictures, say, pictures A and B, of commercially aceptable quality. In FIG. 2, the block 30 may be a receiver stage for receiving and demodulating the multiplexed system transmitted by the system of FIG. 1, or it may be a video tape recorder on which the multiplexed signal has been pre-recorded. The multiplexed signal from the receiver or recorder, as the case may be, which, it will be recalled, consists of odd-numbered fields from source A in alternation with even-numbered fields from source B, is directly applied to a pair of gates 32 and 34, and also to a delay means 36 capable of producing a delay of approximately 262 horizontal lines, the delay being less than 262H by the amount of delay introduced by a line interpolator 38 to which the delayed signal is applied, such that the total delay is exactly 262H (in the case of NTSC standards). The delay means 36 may be of an analog type consisting of a magnetic disc provided with a recording head, a reading head located a field minus slightly more than half a line downstream of the recording head, and an erase head located downstream of the reading head, with the disc rotated at a speed such that the writing and reading heads are circumferentially displaced along the track of the disc so that information entering the writing head leaves the reading head approximately one field time later. Alternatively, the delay means may be of a digital type of any of several forms known to the art, one of which will be described hereinafter in connection with FIG. 4. As shown in FIG. 2A, the line interpolator 38 is of a form well known in the art consisting of a circuit 38a operative to invert the chroma signal in the multiplexed video signal from delay means 36 and delaying the multiplexed signal by one H and an adding circuit 38b having a gain of one-half for combining the delayed signal from circuit 38a with the undelayed signal.

The output signal from the line interpolator 38 is applied to both of another pair of gates 40 and 42, the outputs of which are respectively combined with the outputs of gates 32 and 34 and applied to respective display or recording means 44 and 46. The general function of the delay means 36 and the gates is to interlace each received A field with itself and to interlace each received B field with itself to produce two separate pictures, A and B, of commercially acceptable quality.

To this end, the gates are controlled in a manner such as to cause interlacing of a delayed A field with the next succeeding or preceding "live" A field, and to cause interlacing of a delayed B field with the next succeeding or preceding "live" field. Gating waveforms for the gates for accomplishing this are produced by a sync stripper/separator 48 to which the signal from the receiver or recorder is applied and a pair of decoding odd/even gate generators 50 and 56 of known construction, each operative in responsive to the H and V sync pulses for generating odd ("O") and even ("E") gating waveforms. The "O" waveform from generator 50, schematically shown at 52, is applied to the gate electrode of gate 32, and the "E" waveform 54 from generator 50, which is the inverse of waveform 52, is applied to the gating electrode of gate 40. The gating circuits are arranged to conduct the signal applied to its input when the gating pulse is "up", and to block the applied signal when the gating waveform is "down".

Similarly, the odd/even gate generator 56 is operative in response to the H and V signals from sync stripper/separator 48 to produce E gating waveform 60 and 0 gating waveform 58 which are applied to the gating electrodes of gates 42 and 34, respectively. It is significant to note that the gating waveforms 52, 54 and 58, 60 are unsymmetrical; that is, that the up portion of the 0 waveforms 52 and 58 are of greater duration than the down portions or, conversely, that the up portion of the even waveforms 54 and 60 are of shorter duration than the down portions. More specifically, the leading edge (time $t_1$) of the longer pulse coincides with the start of the vertical blanking interval of the NTSC composite signal and the trailing edge (time $t_2$) coincides at the earliest with the end of the post-equalizing pulses of the next field. The longer pulse in the case of both waveforms 52 and 58 opens the gate to which the live signal is applied, thus ensuring transmission through the gate of a signal containing vertical sync pulses both before and after the picture information, thereby to preserve proper continuity of vertical sync in the reproduced picture. The shorter portion of the gating waveforms, which are utilized to open the gates 40 and 42 to which the delayed signal is applied, are of a duration sufficient to cover the active picture area of a field and nominally have a duration equal to 525 lines minus the duration of the longer pulses, although the duration may be in the range of from 241 ½ lines to 253 ½ lines. Thus, in the case of gates 32 and 40, for example, gate 32 is rendered conductive for the duration of the up portion of gating waveform 52 to transmit the live picture area of the odd-numbered fields of picture A and the first nine lines of vertical interval on either side of it, whereupon the gate 40 is rendered conductive by the up portion of gating waveform 54 to transmit the active picture area of the odd-numbered field of picture A that occurred a field time earlier, with the consequence that the combined output from gates 32 and 40 is a live field of picture A interlaced with the same field delayed by 262H. Similarly, gates 34 and 42 cause interlacing of live fields of picture B with the same field delayed by 262H. It is significant to note that the described gating arrangement enables interlacing of live and delayed fields for both pictures A and B with a single field store 36. The interlaced fields representing pictures A and B are applied to respective display devices or recorders 44 and 46.

The general operation of the system of FIG. 2 having been described, the significance of utilizing a delay of 262 lines, namely, a field minus half a line, instead of a true field of delay, namely 262 ½ lines, will now be more fully explained. When a delay of exactly 262 lines is used, the delayed version of a field, say of picture A, is fully interlaced with the next succeeding live field positionally, and, moreover, the color subcarrier is in exactly the proper phase for where that pciture will fall with respect to the preceding field. There is no requirement, as there frequently is in various field storage devices of the prior art, of having to invert the chrominance in order to satisfy the exact chrominance relationship from field to field. This will be automatic, for any time a signal is delayed by an even number of lines, one automatically gets the same phase of color subcarrier as in a signal that is not delayed.

Figure 5:
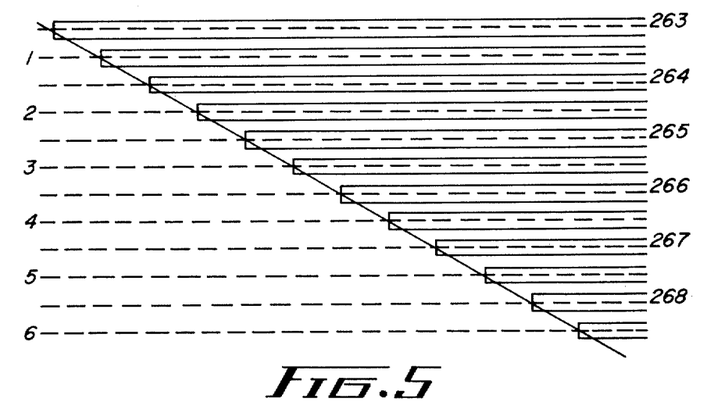
FIGS. 5 through 7 are line diagrams used in the explanation of the operation of the receiving system of FIG. 2.
Figure 6:
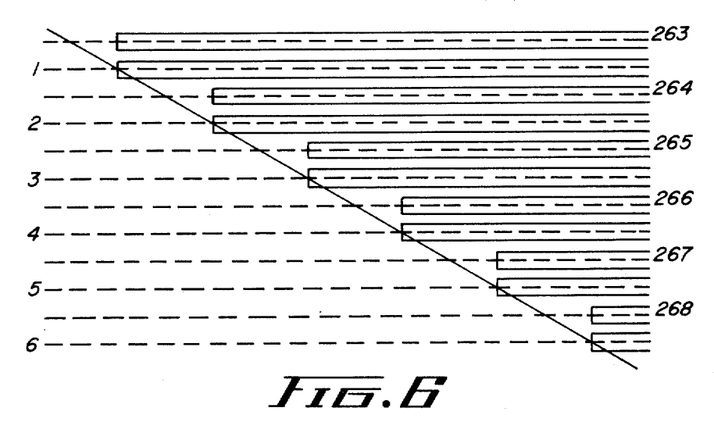
Figure 7:
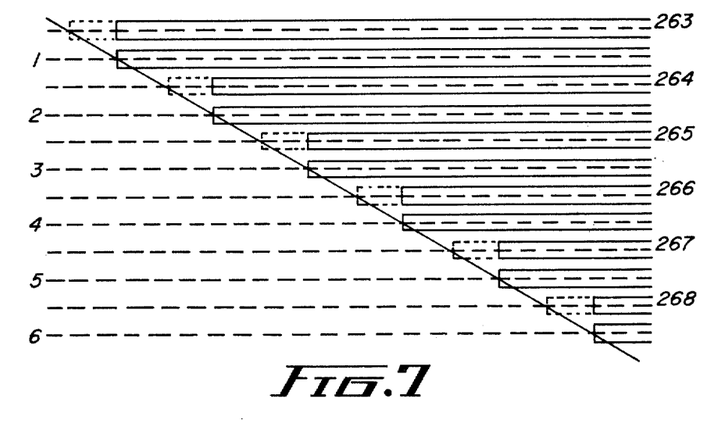

The importance of using a delay of 262H and line interpolation will be further evident from examination of the diagrams of FIGS. 5, 6 and 7. FIG. 5 shows in part a picture comprising a diagonally split scene of black and white with the border extending from upper left to lower right. The centers of scanning lines are dashed and are numbered sequentially from 1 through 6 with the interlaced line numbers starting at 263. Line number 1 can be any line in the picture, and therefore the line above it and interlaced with it in the next field must be line number 263. In the diagram of FIG. 5, the solid outlined bars are the raster lines of white in the picture. The single diagonal line is included for reference only and is the "center of gravity" of the black-white interface.

In the system described above, the picture is reconstructed from only one field by interlacing that field with itself via a delay of $(V-H/2)$ (i.e., 262 lines in the NTSC system) to produce a picture as shown in FIG. 6, which, it will be noted, has a somewhat objectionable serrated effect along the interface between black and white. In accordance with another aspect of the invention, a two-line averager (line interpolator 38) is provided to "soften" the edge of the repeat lines. This may be visualized by recognizing that line 264 (for example) comprises equal parts of lines 1 and 2, which is represented by the dotted line extensions on lines 263, 264, 265, etc., in FIG. 7. This averaging is accomplished by the circuit shown in FIG. 2A which provides both the H delay (for averaging with undelayed video) plus the necessary chrominance inversion for proper phase of the H delayed video. Thus, the use of a delay of $(V-H/2)$ accomplishes two very important results: it provides a reconstructed field with the proper chrominance phase and permits the use of line-interpolation on the delayed signal since the two-line average creates the illusion of having the reconstructed lines fall where they belong on curves or diagonals occurring in the picture.

Figure 8:
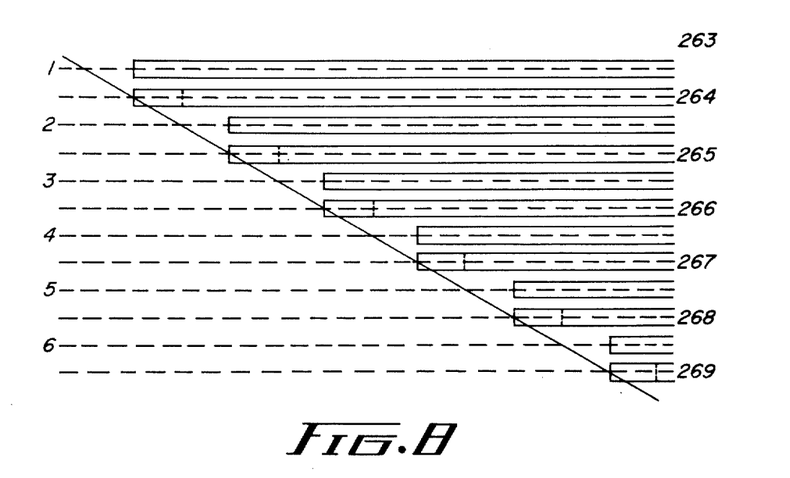
FIGS. 8 and 9 are lines diagrams used in the explanation of the receiving system of FIG. 3.

Although the described system utilizes a delay of exactly 262H, and is to be preferred for the reasons discussed, it is possible to interlace a field with itself by using a delay greater than one field or, more specifically, exactly 263H or $(V+H/2)$. Aside from the chroma inversion necessitated by delaying by an odd number of lines, line interpolation for the lines numbered 263, 264, et seq. in FIG. 8 would require access to a television line that has not yet occurred if one applies line interpolation to the video delayed by 263H. To wit, to properly interpolate for lie 265 (for example), it is necessary to average between lines 2 and 3; this is represented by the dotted retraction or shortening of the line. Since line 265 follows from the repeat of line 2 (263H later) line 3 is not yet available, although line 1 would be via an H delay but is of no value for interpolation.

Figure 3:
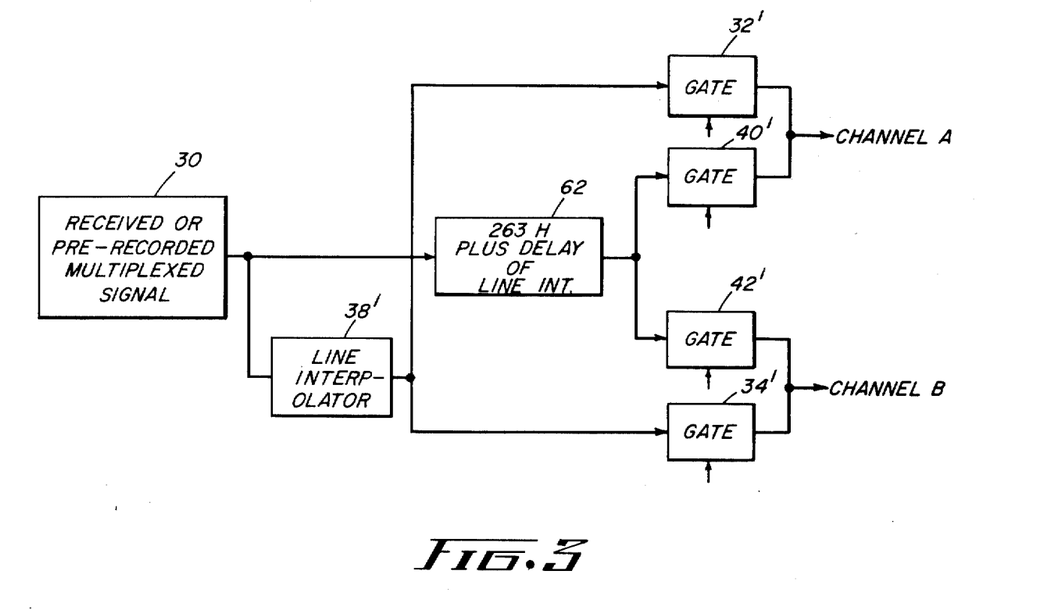
FIG. 3 is a partial block diagram of another form of receiving system.
Figure 9:
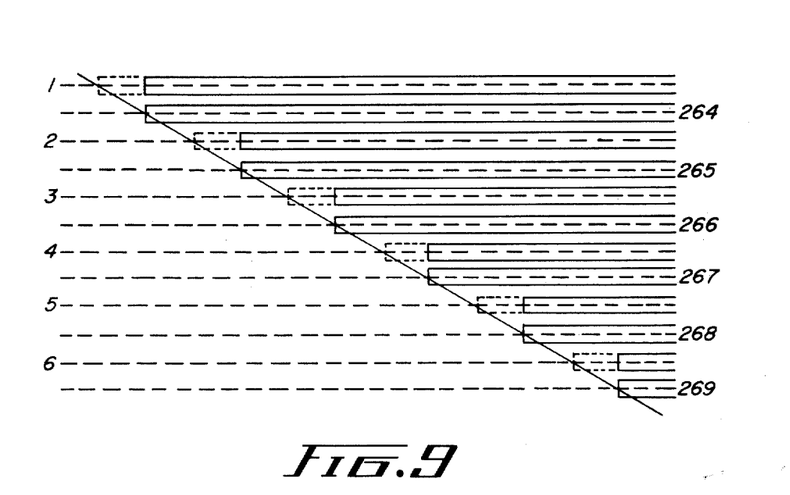

However, FIG. 3 illustrates an alternate system of line interpolation in which a delay of 263H must be used, and FIG. 9 diagrammatically illustrates the operation of the system of FIG. 3. Instead of interpolating the delayed field as in the system of FIG. 2, in the system of FIG. 3, the "real-time" field from the receiver or video tape recorder 30, whose lines are numbered 1, 2, etc., in FIG. 9, are interpolated by a line interpolator 38'. Line interpolator 38' may be of the form illustrated in FIG. 2A and the output signal therefrom is applied to the gates 32' and 34'; the control for the gates have been omitted from FIG. 3 for clarity, but the live gates 32' and 34' would, in contrast with the system of FIG. 2, be rendered conductive by the shorter portion of the control waveforms illustrated in FIG. 2. The multiplexed signal is applied to and is delayed by a delay system 62 having a delay of 263H plus the delay introduced by line interpolator 30', the delayed signal being applied to the inputs of both gates 40' and 42', which gates, in contrast with the system of FIG. 2, are rendered conductive by the longer portion of the gating waveforms illustrated in FIG. 2. This configuration has two minor disadvantages: first, the need for an additional chroma inversion following the 263H delay unit, and second, the shift downward of the entire picture by one frame line in the raster, a matter of trivial consequence.

The chroma inversion following the 263H delay unit 62 and the other inversion in the line interpolator are needed if the output video chroma is to be in phase with a local reference subcarrier, this being a requirement to be able to properly fade or mix this picture with others at the same time. However, should this not be a requirement, the two just-mentioned chroma inversions may be replaced by a single one in the undelayed line to the adder 38b in the line interpolator 38. In this case, the chroma signal will end up 180° out of phase with the reference subcarrier, but the proper decoding of the multiplexed television pictures will have been accomplished.

Figure 4:
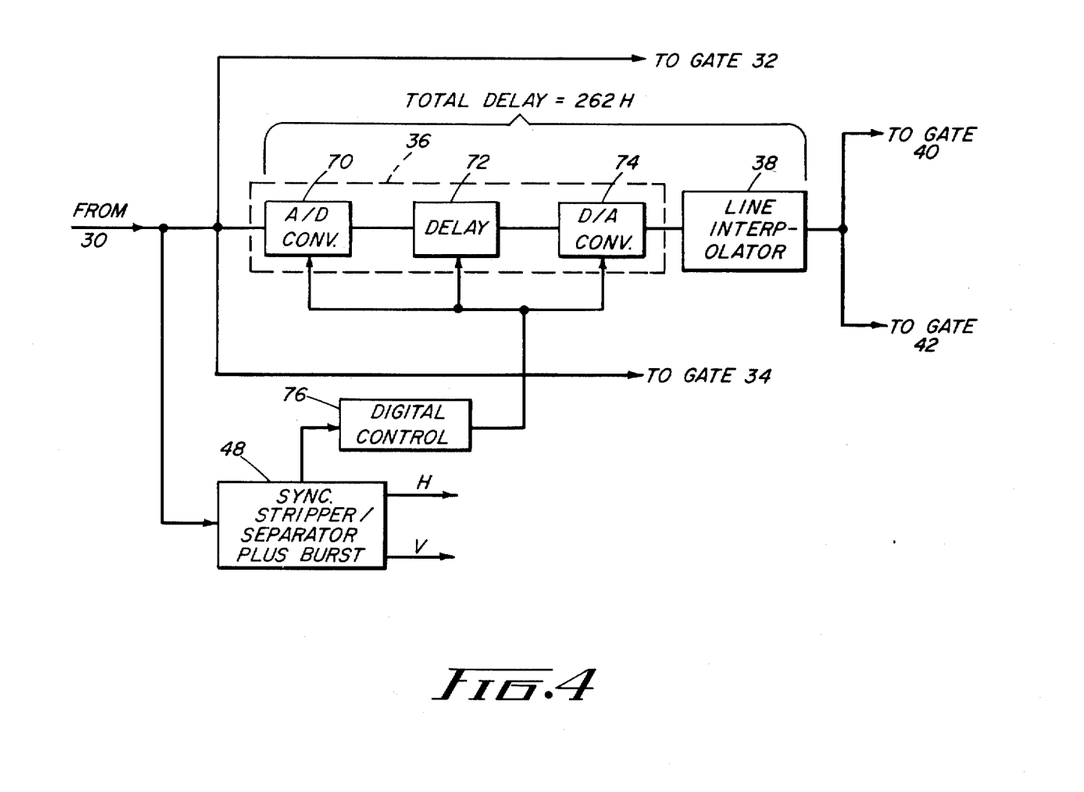
FIG. 4 is a block diagram of a portion of the system of FIG. 2, and illustrating a digital delay system.

It has been mentioned earlier that the delay unit 36 (and the same applies to delay unit 62) may be either analog or digital, and a known form of analog delay device has been briefly described. FIG. 4 illustrates in block diagram form a digital implementation of the delay unit 36. In this implementation, the multiplexed signal from the receiver or recorder 30 is applied to an analog-to-digital converter 70, the output of which is applied to a digital delay device such as a shift register or a random access memory or other known device, and then the delayed signal is converted to analog form by a suitable digital-to-analog converter 74. The analog signal from converter 74 is then applied to line interpolator 38, the output of which is applied as an input to both gates 40 and 42 as shown in FIG. 2. Alternatively, the line interpolation could be performed while the signal is still digitized, namely, by providing a suitable digital line interpolator between delay unit 72 and the digital-to-analog converter 74. In either case, the total delay between the input to the analog-to-digital converter 70 and the input to gates 40 and 42 should be exactly 262H (in the preferred embodiment). The converters 70 and 74 be it a shift register or a random access memory, are all clocked in synchronism by clock pulses generated by a digital control system 76 which, in turn, is controlled by the burst signal stripped from the multiplexed input signal by sync stripper/separator 48.

Although the invention has been described as applied to the NTSC system of television, it can, with suitable modification to take into account certain operational differences that will be now apparent to ones skilled in the art, be applied to the PAL or SECAM systems, the only other two practical television systems in the world today. Accordingly, it is within the contemplation of the invention, and the claims are intended to encompass, PAL and SECAM television systems as well as NTSC.

We claim:

1. A color television transmission system comprising: first and second sources of color television picture information in common synchronism;

encoder means for transmitting or recording the odd-numbered fields of the picture information from said first source in alternation with the even-numbered fields of the picture information from said second source; and means for decoding the transmitted or recorded fields, said decoding means including first and second apparatus output terminals, means for separating the fields of picture information from the first source from the fields of picture information from the second source, means for delaying each of said separated fields for a period differing from one television field period by one-half a television line, and means for couplng to said first apparatus output terminal each of the undelayed fields of picture information from the first source in alternation with the delayed version of the same field and for coupling to said second apparatus output terminal each of the undelayed fields of picture information from the second source in alternation with the delayed version of the same field to produce at said first and second apparatus output terminals first and second signals representing interlaced delayed and undelayed fields of picture information from said first and second sources, respectively.

2. Apparatus according to claim 1, wherein the delay period of said delay means is 262 television lines.

3. Apparatus according to claim 1, wherein the delay period of said delay means is 263 television lines.

4. Apparatus according to claim 2, further including means for line-interpolating said delayed fields prior to their combination with the undelayed fields.

5. Apparatus according to claim 3, further including means for line-interpolating said undelayed fields prior to their combination with the delayed fields.

6. Apparatus according to claim 4, wherein said line-interpolating means comprises means for combining an undelayed signal with the signal delayed by one television line period with the latter signal having had its chrominance component inverted.

7. Apparatus according to claim 5, wherein said line-interpolating means comprises means for combining an undelayed signal with the signal delayed by one television line period with the latter signal having had its chrominance component inverted.

8. Apparatus according to claim 2, wherein the separating, delaying and combining means in said decoding means comprises:

a single delay unit having an input terminal and an output terminal to the input terminal of which said transmitted or recorded fields are applied, first, second, third and fourth gating circuits each having input, output and control terminals, means for coupling said transmitted or recorded fields to the input terminal of both of said first and second gating circuits, means connecting the output terminal of said delay unit to the input terminal of both said third and fourth gating circuits, means connecting the output terminals of said first and third gating circuits together and to a first apparatus output terminal, means connecting the output terminals of said second and fourth gating circuits together and to a second apparatus output terminal, and gate generator means operative in response to the horizontal and vertical synchronizing pulses contained in said transmitted or recorded fields for producing and applying gating signals to the control terminals of said first, second, third and fourth gating circuits for rendering said gating circuits conductive and non-conductive at such times and for such durations to produce at said first and second output terminals, respectively, said first and second signals representing interlaced delayed and undelayed picture information from said first and second sources.

9. Apparatus according to claim 8, wherein said gate generator means is operative to produce rectangular waveform gating signals each consisting of a pulse of predetermined first duration followed by a pulse of predetermined second shorter duration and opposite polarity, the sum of said first and second durations corresponding substantially to the period of two television fields and the leading edge of the pulse having said first duration being in time synchronism with the start of the vertical blanking interval of a television field and having a duration corresponding to the period between the start of the vertical blanking interval of a television field and substantially the end of the post-equalizing pulses of the next field, said gating signals being applied to the control terminals of said gating circuits and being so phased relative to each other that positive-going pulses of said first duration alternately render said first and second gating circuits conductive and positive-going pulses of said second duration alternately render said third and fourth gates conductive.

10. Apparatus according to claim 9, further including means connected between the output terminal of said delay unit and the input terminals of said third and fourth gating circuits for line-interpolating said delayed fields, and wherein the combined delay of said delay unit and said line-interpolating means is 262 television lines.

11. Apparatus according to claim 10, wherein said line interpolating means comprises means for combining an undelayed signal with the signal delayed by one television line period with the latter signal haing had its chrominance component inverted.

12. Apparatus for reproducing picture information contained in a multiplexed signal consisting of odd-numbered fields from a first source of color picture information in alternation with even-numbered fields from a second source of color television picture information synchronized with said first source, said apparatus comprising:

first and second apparatus output terminals, means for separating the fields of picture information from the first source from the fields of picture information from the second source, means for delaying each of said separated fields for a period differing from one television field by one-half of a television line, and means for coupling to said first apparatus output terminal each of the undelayed fields of picture information from the first source in alternation with the delayed version of the same field and for coupling to said second apparatus output terminal each of the undelayed fields of picture information from the second source in alternation with the delayed version of the same field for producing at said first and second apparatus output terminals first and second signals representing interlaced delayed and undelayed fields of picture information from said first and second sources, respectively.

13. Apparatus according to claim 12, wherein the delay period of said delay means is 262 television lines.

14. Apparatus according to claim 12, wherein the delay period of said delay means is 263 television lines.

15. Apparatus according to claim 13, further including means for line-interpolating said delayed fields prior to their combination with the undelayed fields.

16. Apparatus according to claim 14, further including means for line-interpolating said undelayed fields prior to their combination with the delayed fields.

17. Apparatus according to claim 15, wherein said line-interpolating means comprises means for combining an undelayed signal with the signal delayed by one television line period with the latter signal having had its chrominance component inverted.

18. Apparatus according to claim 16, wherein said line-interpolating means comprises means for combining an undelayed signal with the signal delayed by one television line period with the latter signal having had its chrominance component inverted.

19. Apparatus according to claim 13, wherein said separating, delaying and combining means comprises:
a single delay unit having an input terminal and an output terminal to the input terminal of which said multiplexed signal is applied,
first, second, third and fourth gating circuits each having input, output and control terminals,
means for coupling said multiplexed signal to the input terminal of both of said first and second gating circuits,
means coupling the output signal from said delay unit to the input terminal of both said third and fourth gating circuits,
means connecting the output terminals of said first and third gating circuits together and to a first apparatus output terminal,
means connecting the output terminals of said second and fourth gating circuits together and to a second apparatus output terminal, and
gate generator means operative in response to the horizontal and vertical synchronizing pulses contained in said multiplexed signal for producing and applying gating signals to the control terminals of said first, second, thrid, and fourth gating circuits for rendering said gating circuits alternately conductive and non-conductive at such times and for such durations to produce at said first and second apparatus output terminals, respectively, said first and second signals representing interlaced delayed and undelayed picture information from said first and second sources.

20. Apparatus according to claim 19, wherein said gate generator means is operative to produce rectangular waveform gating signals each consisting of a pulse of predetermined first duration followed by a pulse of predetermined second shorter duration and opposite polarity, the sum of said first and second durations corresponding substantially to the period of two television fields and the leading edge of the pulse having said first duration being in time synchronism with the start of the vertical blanking interval of a television field and having a duration corresponding to the period between the start of the vertical blanking interval of a television field and substantially the end of the post-equalizing pulses of the next field, said gating signals being applied to the control terminals of said gating circuits and being so phased relative to each other that positive-going pulses of said first duration alternately render said first and second gating circuits conductive, and positive-going pulses of said second duration alternately render said third and fourth gates conductive.

21. Apparatus according to claim 20, wherein the means for coupling the output signal from said delay unit to the input terminals of said third and fourth gating circuits includes means for line-interpolating said delayed fields, and wherein the combined delay of said delay unit and said line-interpolating means is 262 television lines.

22. Apparatus according to claim 21, wherein said line-interpolating means comprises means for combining an undelayed signal with the signal delayed by one television line period with the latter signal having had its chrominance component inverted.

* * * * *